3 Sheets—Sheet 1.

T. SIM.

PROCESS FOR PRESERVING MEAT OR ANIMAL MATTER.

No. 7,564. Reissued March 20, 1877.

Fig. I.

WITNESSES

Wm. A. Stuckle

F. Pitch

INVENTOR

Thomas Sim.

By his Attorneys.

Baldwin, Hopkins & Peyton.

3 Sheets—Sheet 2.

T. SIM.

PROCESS FOR PRESERVING MEAT OR ANIMAL MATTER.

Reissued March 20, 1877.

No. 7,564.

INVENTOR

Thomas Sim.

WITNESSES

Wm A Skinkle

J. Hill

By his Attorneys.

Baldwin, Hopkins & Peyton.

3 Sheets—Sheet 3.

T. SIM.

PROCESS FOR PRESERVING MEAT OR ANIMAL MATTER.

No. 7,564. Reissued March 20, 1877.

WITNESSES

Wm A Skinkle

F. Stich

INVENTOR

Thomas. Sim.

By his Attorneys

Baldwin, Hopkins & Peyton

UNITED STATES PATENT OFFICE

THOMAS SIM, OF MORRISTOWN, NEW JERSEY.

IMPROVEMENT IN PROCESSES FOR PRESERVING MEAT OR ANIMAL MATTERS.

Specification forming part of Letters Patent No. 85,184, dated December 22, 1868; reissue No. 7,564, dated March 20, 1877; application filed February 21, 1877.

*To all whom it may concern:*

Be it known that I, THOMAS SIM, late of Charleston, in the State of South Carolina, now of Morristown, State of New Jersey, doctor of medicine, have invented a certain new and useful Process for Preserving Meat or Animal Matters; and I hereby declare that the following is a sufficiently full and clear description to enable one skilled in the science and art to which my invention appertains to use it, reference being had to the accompanying illustrative drawings, which form a part of this specification, and which represent one form of apparatus for carrying my process into effect.

My invention relates, first, to the employment or use of the bisulphide of carbon applied in gaseous form, or any equivalent gas or vapor to meat or animal matter, from which air has been partially or entirely removed, so that the said gas or vapor will be caused to permeate the meat or animal body to be preserved, for the purposes hereafter named.

Second, to the use, in combination with bisulphide of carbon, of any suitable product of the destructive destillation of wood or coal.

My invention consists in the process of preserving animal matter by subjecting it to the action of bisulphide of carbon or equivalent in gaseous form, under heat and pressure, when the air has been partially or entirely removed, or by treating it with the vapor of bisulphide of carbon in connection with any suitable product of the distructive distillation of wood or coal.

It is intended to apply this invention to the preserving of animal food of all kinds as well as fish and fish-waste for the manufacture of fertilizers or any animal matter which it may be desired to keep fresh.

Figure 1:
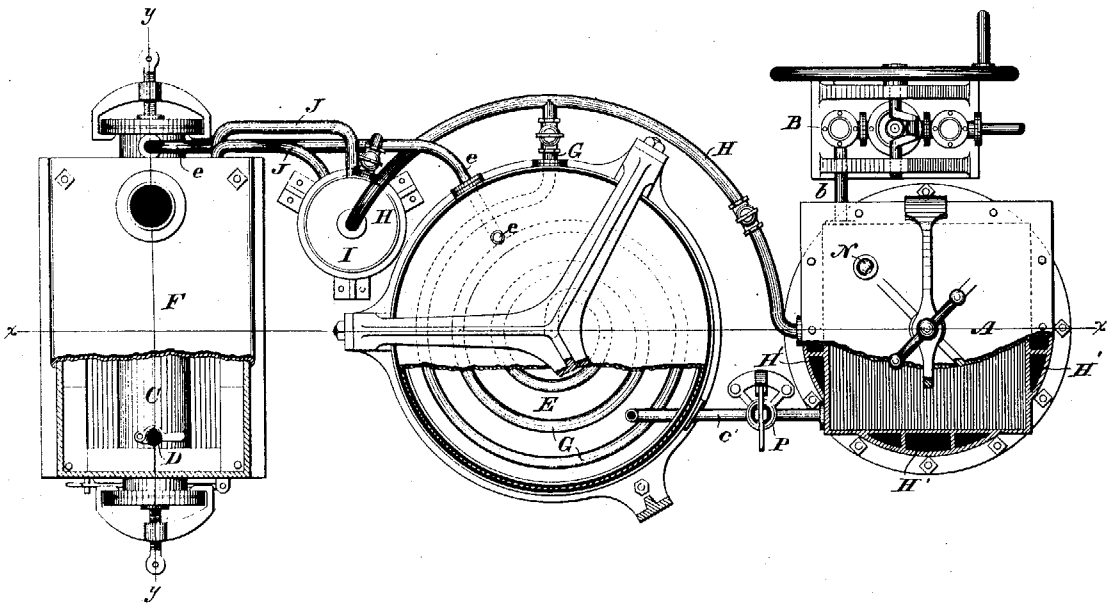
Figure 2:
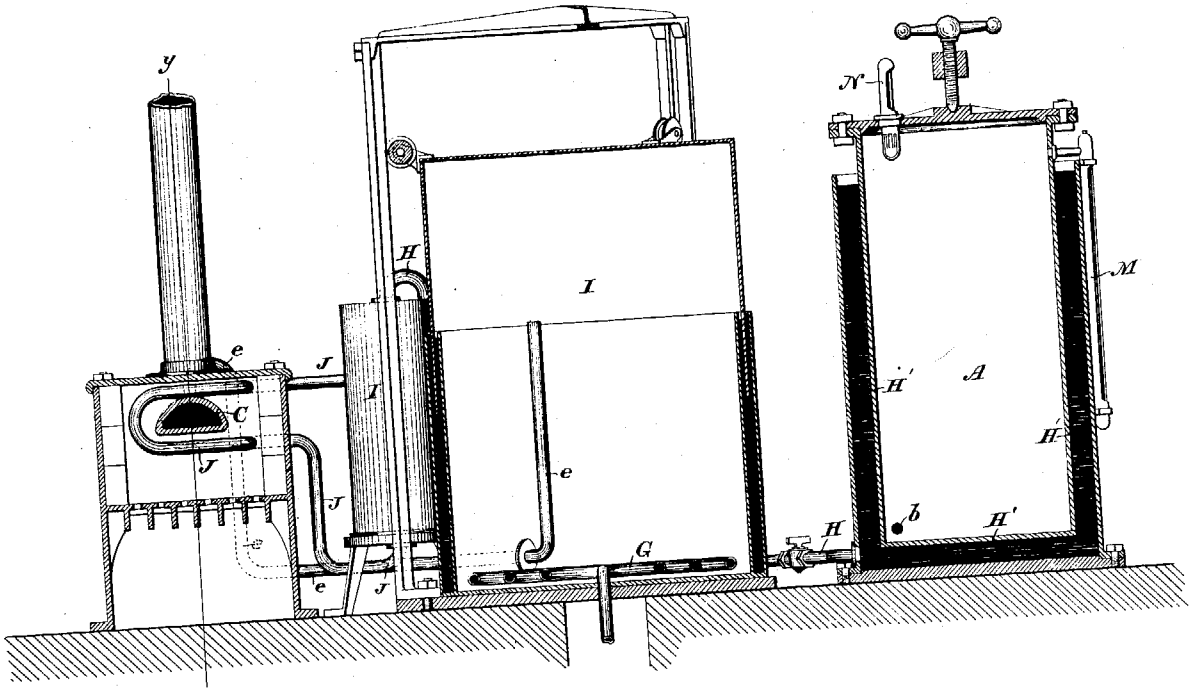
Figure 4:
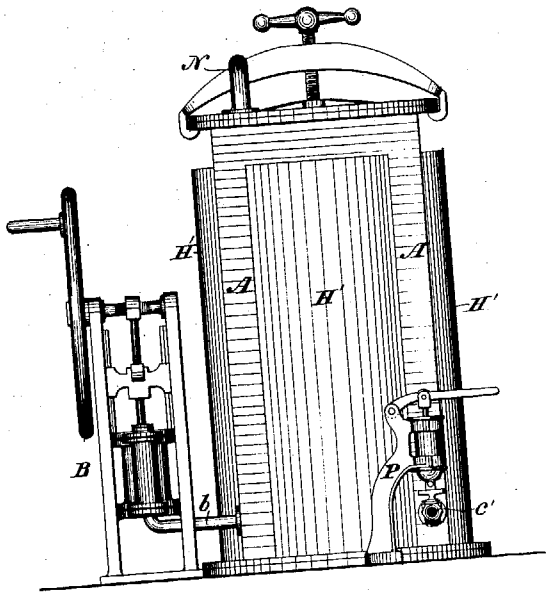
Figure 5:
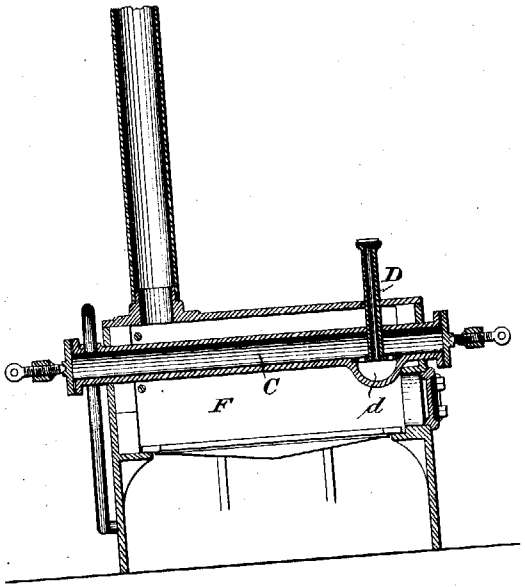

In the drawings, Figure 1 is a plan view, partly in horizontal section, of my apparatus, under one of the various forms in which it may be made. Fig. 2 represents a vertical section thereof, in the plane indicated by the line *x x* in Fig. 1. Fig. 3 represents a vertical section in the plane indicated by the lines *y y*, Figs. 1 and 2. Fig. 4 represents an elevation of the vat and its accessories, hereinafter described.

I will now describe the manner in which I prefer to apply my invention to the preservation of animal matter desired to be preserved fresh for food.

The meat which is to be preserved, either in whole carcasses or in parts, is suspended from hooks within a vat or receiver, A, from which the air is then exhausted as completely as practicable through a pipe, *b*, by an air-pump, B, or other means. The vat A is then rapidly filled with gaseous bisulphide of carbon, or some equivalent gas or vapor, either with or without phenic acid, methyl, or other product of the destructive distillation of wood or coal.

The sulphide of carbon or other vapor or gas employed may be produced by any of the well-known methods.

Under the present illustration I employ for this purpose a retort, C, which is charged with charcoal, and heated to redness. Sulphur is then introduced through the pipes D, conducting down to a well, *d*, in which the sulphur is burned. The sulphur vapor passing through or in contact with the incandescent charcoal is converted into bisulphide of carbon, according to the well-known process. This gas is conducted through a pipe, *e*, into a gas-holder, E, of common construction, the lower part of which is, in the first instance, filled with water for the purpose of excluding air, the said water being afterward drawn off and replaced by the gas. When any equivalent gas or vapor is to be used it may be formed in any convenient manner, and stored in any suitable gas-holder.

At the time of introducing the gas into the exhausted receiver, but the gas and the receiver or vat should have a temperature of from 90° to 120° Fahrenheit (averaging 104°) and to guard against the danger of cooling the meat to an injurious extent by the expansion *in vacuo* of the gas within the vat, I provide a supply of gas equal to about double the capacity of the vat, and admit it to the latter instantaneously, applying pressure by means of a suitable pump, P, in the gas-supply pipe *c'*, to make the influx of gas more rapid, and by continued pressure the curing process may be hastened.

The gas-holder and the vat can be heated by hot water circulated through pipes G H connecting with a reservoir, I, from which the water passes to and through the furnace F, and back to the reservoir through the pipe or pipes J J. Chambers H′ around the vat A, receive the hot water from the pipe H, for the purpose of heating the interior of the vat. M represents a barometer, to indicate the extent of the vacuum within the vat A. N is a thermometer to indicate the temperature.

The mode which I have described of applying my invention is I believe the best for the preservation of meats, either in whole carcasses or in parts. It will be obvious that modifications, particularly in respect to the extent to which the charging of the mass with the vapors under pressure should be carried, will be necessary or expedient, according to the character or condition of the article to be preserved for food, or according to the purpose for which it is to be preserved, whether for food or for use as a fertilizer. In its application to the preservation of meat for food it is not desirable that the charging of the mass with the vapor should be carried so far as to remove any nutritious or valuable portion from the meat. On the other hand, in its application to the manufacture of fertilizers from fish waste, for instance, it will be important to charge the fish waste so completely with the vapor, that it will be preserved and thoroughly freed from moisture and other substances that are not valuable as fertilizers, which will pass off with the vapor.

I do not feel able to state with certainty precisely why it is that the permeation of the mass by the gas or vapor effects the result of the removal of matters, which if permitted to remain would produce putrefaction, I believe myself to have been the first to employ for the purpose of such removal, the saturation or thorough permeation of the mass with the vapor of bisulphide of carbon, or equivalent gas or vapor applied under heat and pressure, to accomplish such saturation or permeation.

The office of the preliminary exhaustion of the air from the chamber containing the meat, &c., is to insure its more complete replacement by the gas or vapor in the tissue which is to be saturated. It relates only to the quickness and thoroughness of the operation. The same effect may be obtained by any known equivalent proceeding for accomplishing the complete permeation of the mass with the gas or vapor quickly and thoroughly.

I do not claim the use of carbonic acid, phenic acid, or carbonic oxide, or the like, as these gases are not in my judgment equivalents for the vapor of bisulphide of carbon, not having the properties hereinbefore attributed to that vapor in the described operation of preserving meat, &c. Nor do I claim the use of oxide of ethyl or methyl, or the like, in liquid form, as these have been used for preserving meat.

The following is what I claim as new and desire to secure by Letters Patent:

1. The process of preserving meat and other animal matter, which consists in subjecting the same to the action of the vapor of bisulphide of carbon under heat and pressure, substantially as described.

2. The process of preserving meat and other animal matter, which consists in subjecting the same to the action of the vapor of bisulphide of carbon under heat and pressure, in connection with phenic acid, methyl, or other product of the destructive distillation of wood or coal.

In testimony whereof I have hereunto signed my name.

THOS. SIM.

In presence of—
H. T. MUNSON,
A. F. CROWELL.